United States Patent [19]

Halderman et al.

[11] Patent Number: 5,176,211

[45] Date of Patent: Jan. 5, 1993

[54] APPARATUS AND METHOD FOR RECIRCULATING MUD WHEN DRILLING UNDER AN OBSTACLE

[75] Inventors: Ronald G. Halderman, Richmond; George T. De La Matyr, Jr., Corpus Christi, both of Tex.

[73] Assignee: Baker Energy Resources Corporation, Houston, Tex.

[21] Appl. No.: 760,730

[22] Filed: Sep. 16, 1991

[51] Int. Cl.$^5$ .................... E21B 7/28; E21B 10/26; E21B 21/06; F16L 27/08

[52] U.S. Cl. ........................... 175/66; 175/61; 175/206; 175/217; 175/406; 285/272; 405/184

[58] Field of Search ............. 175/65, 61, 62, 66, 175/206, 207, 217, 321, 406, 320; 405/184, 154; 285/98, 272, 278, 281; 166/77, 384

[56] References Cited

U.S. PATENT DOCUMENTS

| | | | |
|---|---|---|---|
| Re. 32,267 | 10/1986 | Cherrington | 175/53 |
| 2,919,898 | 1/1960 | Marwil et al. | 175/66 |
| 3,301,324 | 1/1967 | Smith . | |
| 3,434,742 | 3/1969 | Swinney | 285/16 |
| 3,894,402 | 7/1975 | Cherrington | 175/53 X |
| 3,905,431 | 9/1975 | Hasewend | 175/53 |
| 4,043,136 | 8/1977 | Cherrington | 175/53 X |
| 4,091,631 | 5/1978 | Cherrington | 175/62 X |
| 4,117,895 | 10/1978 | Ward et al. | 175/53 |
| 4,176,985 | 12/1979 | Cherrington | 405/184 |
| 4,205,866 | 6/1980 | McCracken | 285/281 |
| 4,239,083 | 12/1980 | Silberman et al. | 285/272 X |
| 4,334,580 | 6/1982 | Vann | 166/268 |
| 4,354,698 | 10/1982 | Linder et al. | 285/98 |
| 4,478,438 | 10/1984 | Elorriaga, Jr. | 285/276 |
| 4,784,230 | 11/1988 | Cherrington et al. | 175/61 |
| 4,911,579 | 3/1990 | Lutz et al. | 405/18 X |
| 4,915,543 | 4/1990 | Akesaka | 405/156 |
| 4,925,344 | 5/1990 | Peres | 405/18 X |
| 5,010,966 | 4/1991 | Stokley et al. | 175/66 |

OTHER PUBLICATIONS

Baker Marine Corp., Swivel Section & Details, 1982, p. 1, U.S.A. (Unpublished).

Primary Examiner—Stephen J. Novosad
Attorney, Agent, or Firm—John R. Kirk, Jr.; Mark A. Oathout

[57] ABSTRACT

New apparatii and processes are disclosed to create fluid continuity between opposite ends of a route drilled or bored under and/or around an obstacle. This invention allows fluids to be pumped through a reamer and a hollow swivel from either or both sides of the obstacle. It also allows the direct transfer of fluids from one side to the other through the connecting conduit located in the annular space produced during drilling and reaming operations.

18 Claims, 10 Drawing Sheets

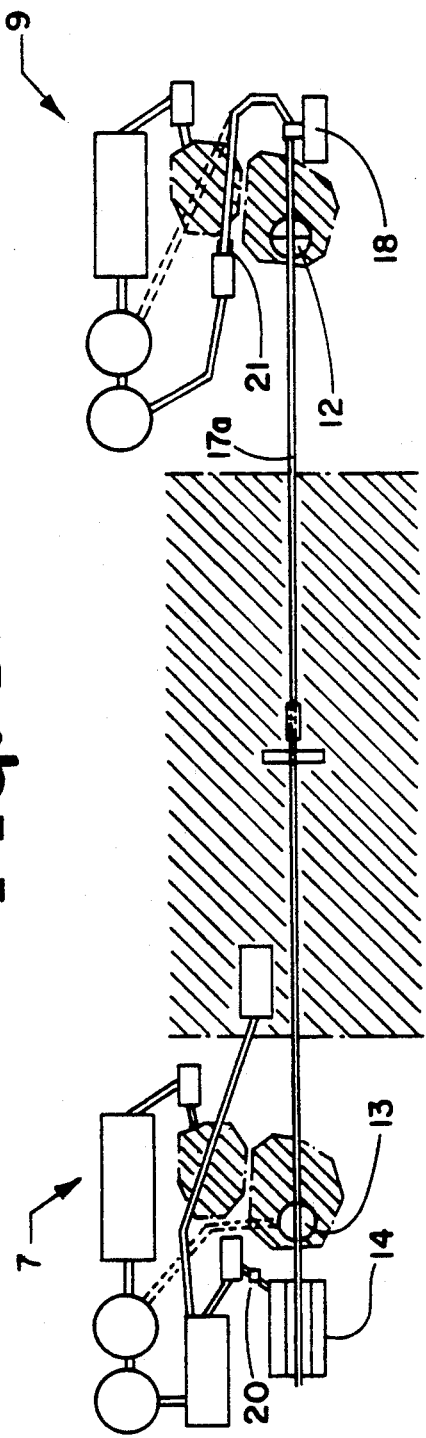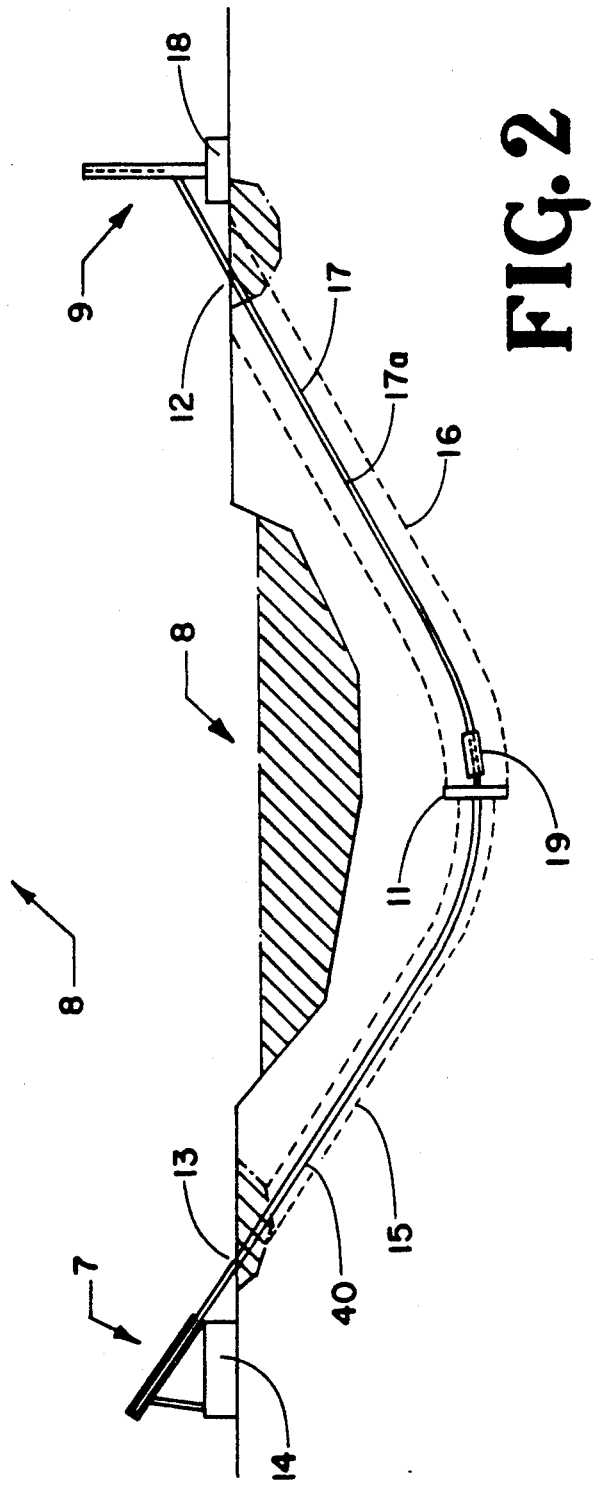

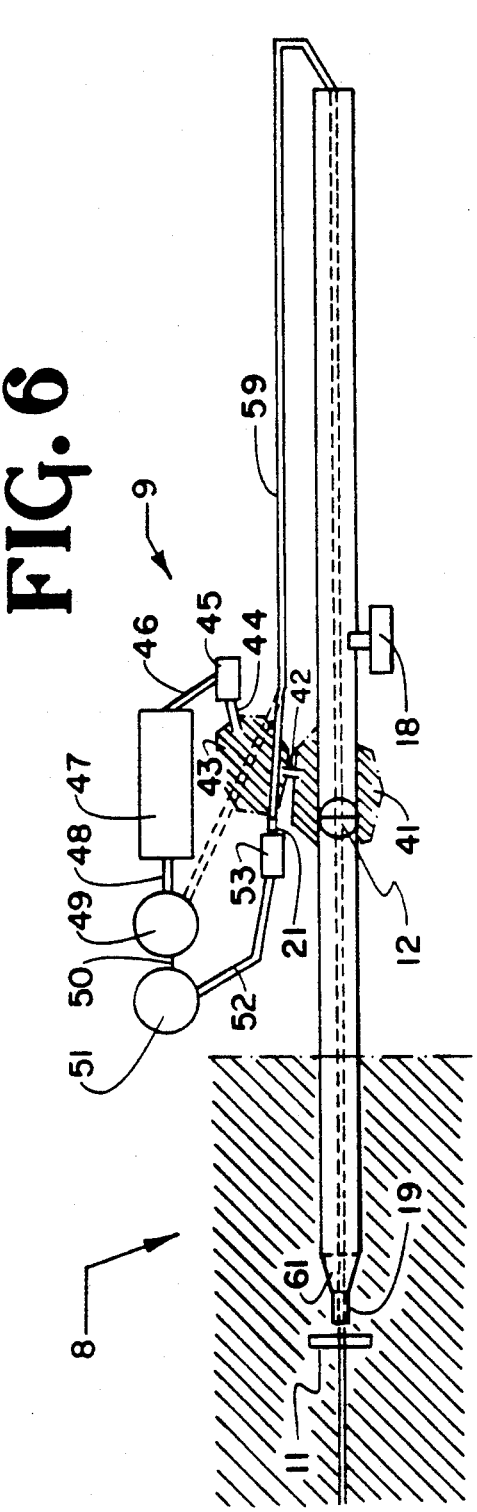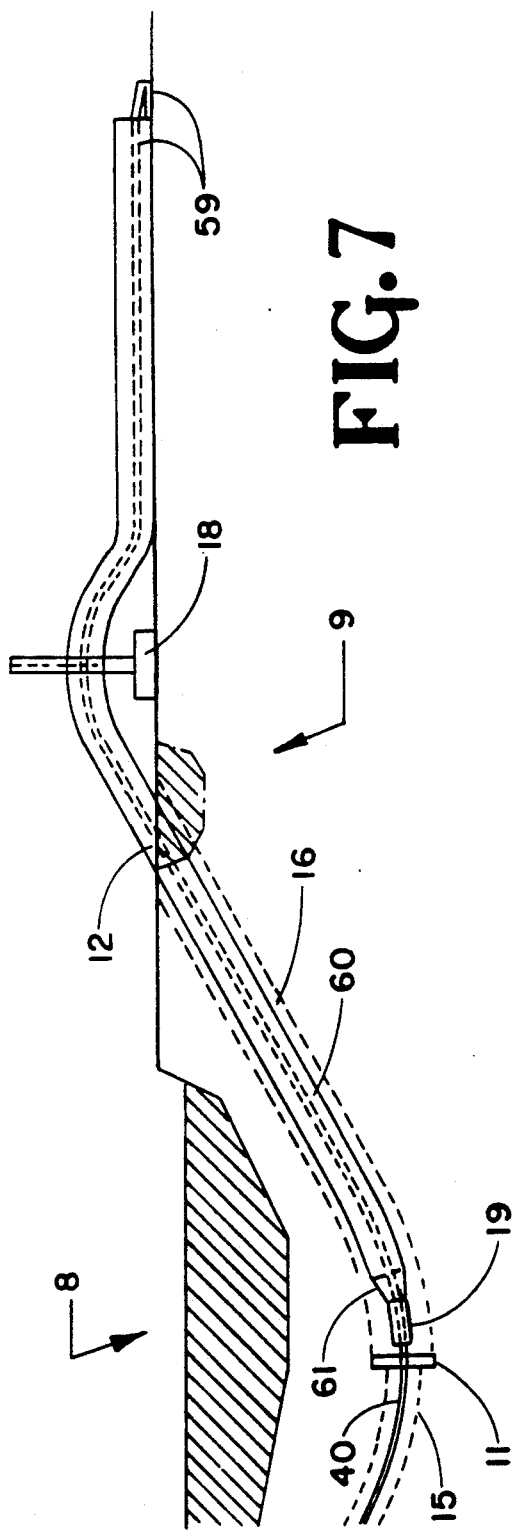

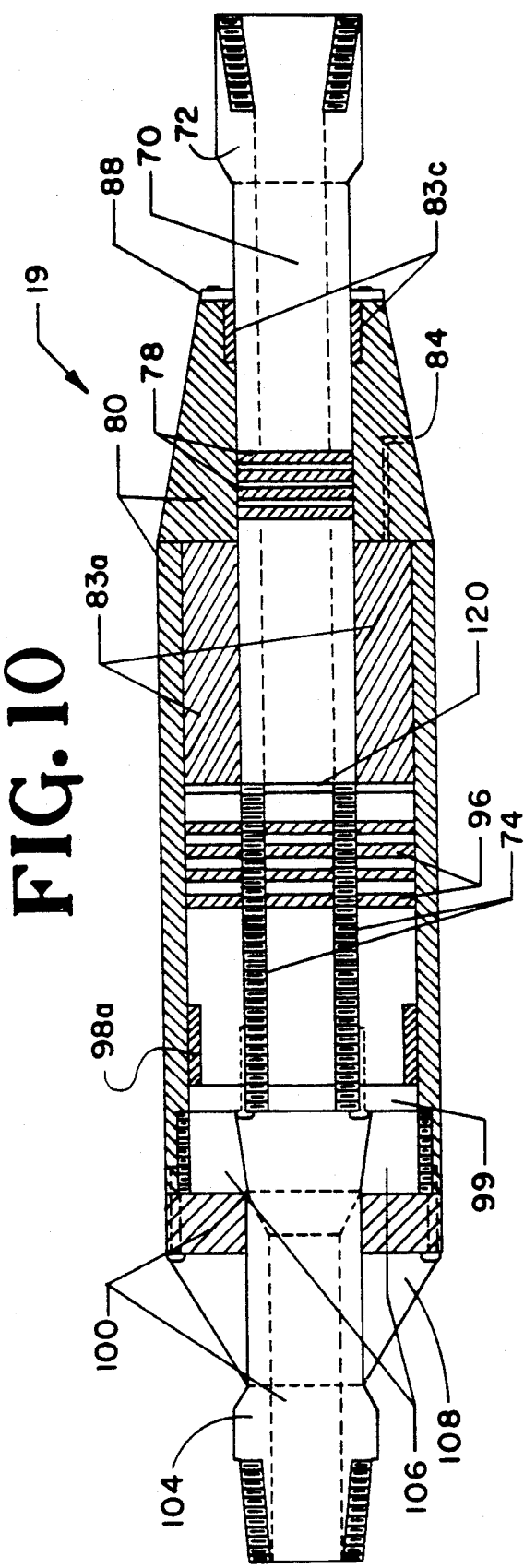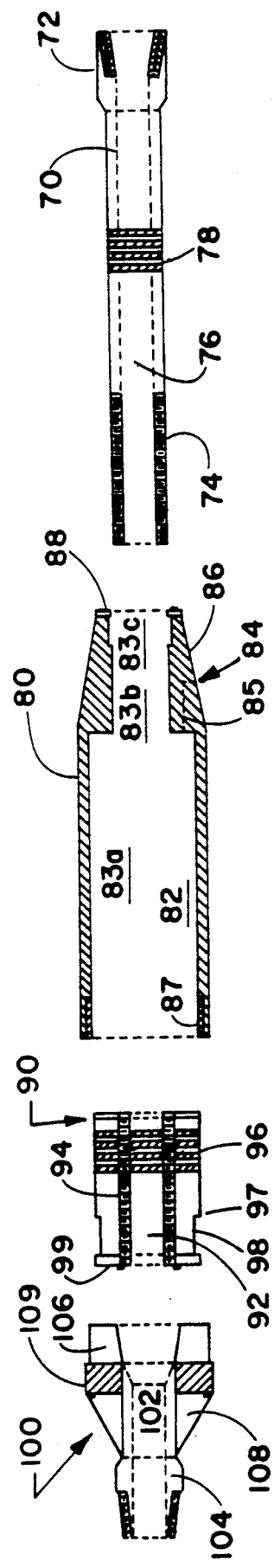

APPARATUS AND METHOD FOR RECIRCULATING MUD WHEN DRILLING UNDER AN OBSTACLE

BACKGROUND

Prior apparatii and methods have been used for drilling underground arcuate paths under and around obstacles. Such techniques use a directional drill or jet attached to a drill string. The directional drill or jet is used to drill a path from one side of the obstacle, going under and/or around the obstacle and exiting on the opposite side of the obstacle. A reamer can be attached to the drill string or washover pipe and pulled back through the hole to further enlarge the diameter of the hole. Reamers of consecutively larger diameters can be pushed and pulled back through the hole until a desired diameter is reached. The reamer is then attached by a swivel connected to the casing intended to be installed in the hole. The reamer is then pulled back through the hole followed by the swivel connection to the casing until the casing occupies the hole. A swivel is required to keep torque from being transmitted from the drill string and reamer to the casing.

Drilling fluid or mud is used to power the jetting action of the reamer and to clean the drilled hole of cuttings. Five to fifteen barrels per minute of mud must be pumped to power a typical reamer. A job lasting several days can require thousands of barrels of mud to complete the reaming operation.

Since the hole is open at both ends during the reaming operation, mud exiting the reamer will follow the path of least resistance. The operator has little or no control over which end of the hole the mud will exit. In all prior methods the mud was supplied to the reamer from the rig side of the hole, exited at the reamer and then flowed out of the hole. Mud exiting on the side opposite the rig side of the hole required transport back to the rig side of the hole or disposal.

Disposing of the drilling mud often requires that the mud be hauled off to a disposal site. Hauling costs of $2.00 to $3.00 per barrel are typical and special sites are often required due to regulations and environmental issues. Transporting the mud back to the rig side is also costly since the obstacle being traversed is often a waterway and the closest bridge over such waterway could be, for example, 35 miles up or down the waterway.

Prior swivels did not have the capability of allowing fluids to pass therethrough while subjected to large tensions. Additionally, such swivels did not totally protect the piston from stresses being placed upon the swivel. In the event of failure the entire piston would need to be replaced. Improvements are also needed to reduce periodic maintenance required to replace the grease or other hydraulic medium which has escaped from the swivel.

A need therefore exists for apparatii and methods for recirculating mud when drilling underground arcuate paths.

SUMMARY

New apparatii and processes are disclosed to create fluid continuity between opposite ends of a route drilled or bored under and/or around an obstacle.

The invention generally relates to methods and apparatii for recirculating mud when a casing or pipeline is to be installed below ground level, under and/or around an obstacle. The invention is particularly useful when the site or location of the obstacle prevents installing a fluids return line above ground level between the two ends of the hole. Large rivers prevent the use of above ground return lines due to the current, distance being traversed and navigability constraints.

This invention allows fluids to be pumped through a reamer and a hollow swivel from either or both sides of the obstacle. It also allows the direct transfer of fluids from one side to the other through the connecting conduit located in the annular space produced during drilling and reaming operations.

BRIEF DESCRIPTION OF THE DRAWINGS

FIG. 1 is a schematic plan view of the operation of the invention as used during pre-reaming.

FIG. 2 is a schematic profile view of the operation of the invention as used during pre-reaming.

FIG. 6 is a schematic plan view of the invention being used during pipe pulling.

FIG. 7 is a schematic profile view of the invention shown in FIG. 6.

FIG. 10 is a cross sectional view of the swivel.

FIG. 11 is an exploded cross sectional view of the swivel shown in FIG. 10.

DETAILED DESCRIPTION

Figure 3:
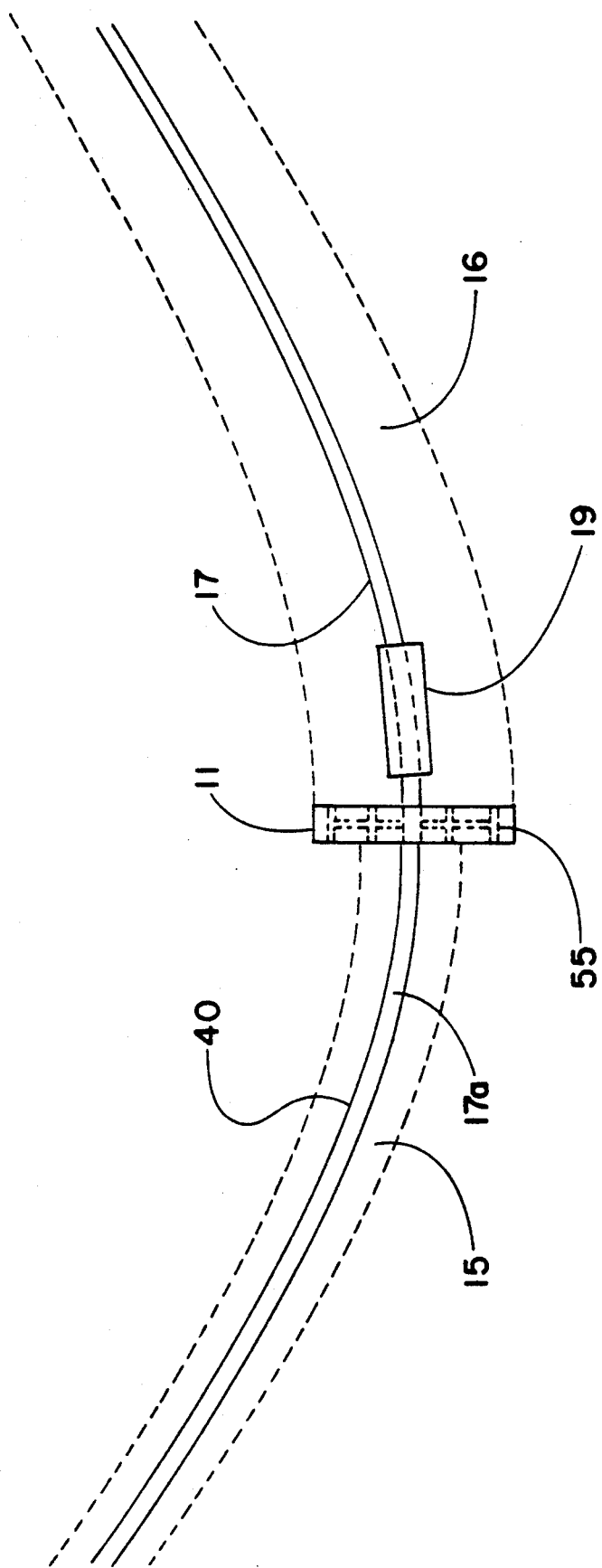
FIG. 3 is a schematic enlargement of the reamer/swivel structures shown in FIG. 2.

Methods and apparatus for drilling a pilot hole under and/or around an obstacle are known to one of ordinary skill in the art. Following the completion of the initial drill under and/or around the obstacle, generally by way of a circuitous path, referring to FIGS. 1-3, a reamer 11 attached to the drill pipe 40 is usually pulled back along the path from the exit point 12 to the entry point 13 by a drilling machine 14. This process enlarges the cross-section of the original drilled hole 15 to a diameter somewhat greater 16 than that of the casing or pipeline which is to be installed. Frequently this step, hereinafter referred to as pre-reaming, must be repeated more than once due to local geology, hydrology, power constraints, etc. If multiple pre-reaming steps are undertaken, additional pipe 17 (which may comprise drill pipe, washover pipe, etc.), attached behind the reamer 11 is continuously added from the exit side 12 as the reamer advances toward the entry side 13. This process insures the drillpipe is always continuously connected between points 11 and 12. A crane or similar machine 18 is used to support each section of drillpipe as it is pulled into the exit hole 12.

With the utilization of a hollow or flow-through reamer 11 and a hollow or flow-through swivel 19 for working the hole, a continuous, open conduit depicted by 17a is available at all times between the entry side 13 and the exit side 12 under and/or around the obstacle. Such a reamer 11 is known to one of ordinary skill in the art. A hollow swivel 19 suitable for the intended purpose is described in more detail below.

Because a continuous conduit 17a exists between both sides of the obstacle, it is possible to pump drilling fluids to the reamer 11 from either end of the conduit 17a by using two valves 20, 21 placed in the fluid flow lines 39, 54, one on each side of the obstacle 8.

Figure 4:
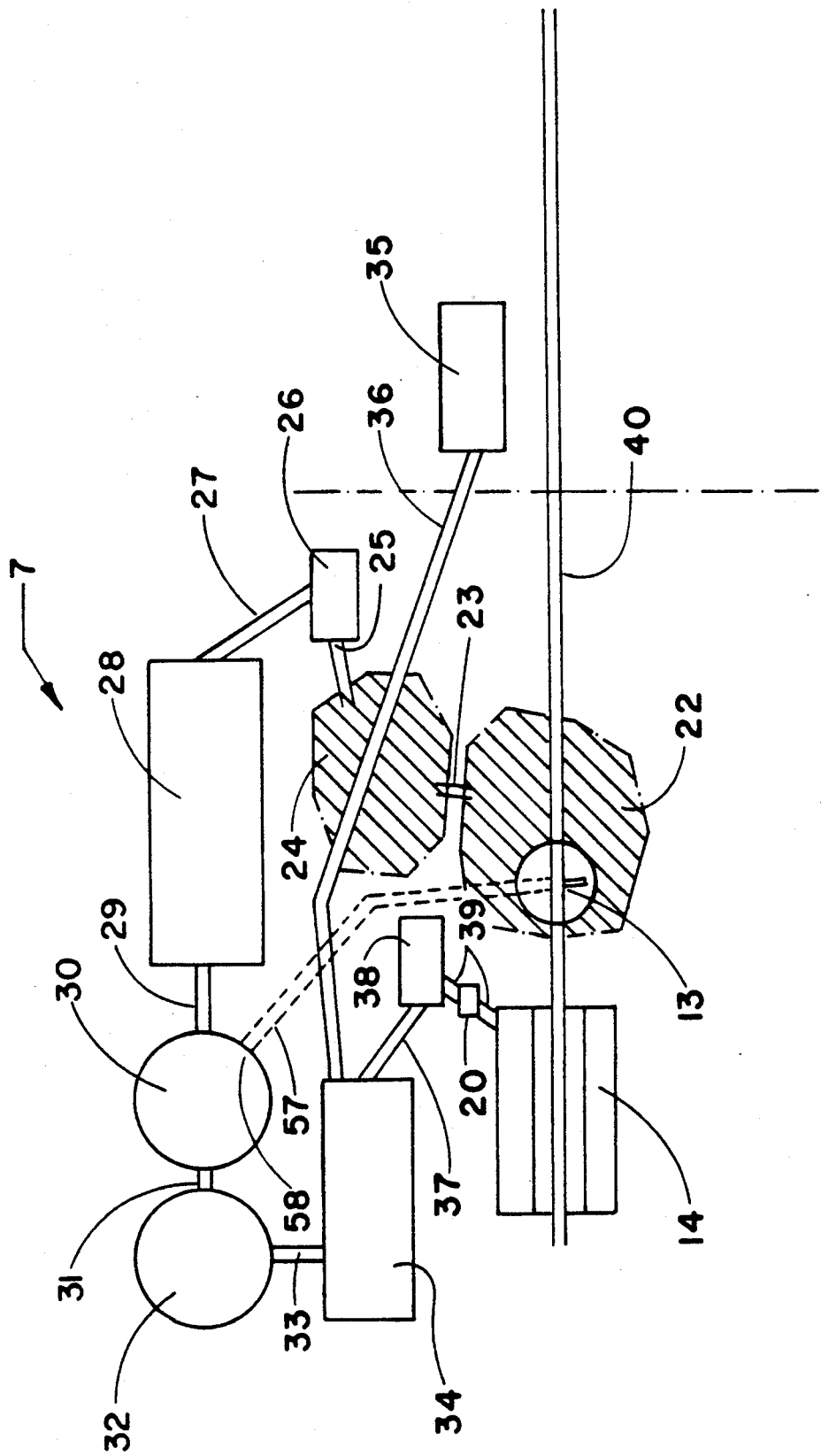
FIG. 4 is a schematic enlargement of the rig side structures shown in FIG. 1.

Referring to FIG. 4 the rig side assembly 7 is shown. The structure and function of each of the individual elements of the rig assembly 7 are known to one of ordinary skill. As shown in FIG. 2 the drilling rig 14 is set up on the rig side of the obstacle 8. Drillpipe 40 occupies and exits at borehole 13. A sump pit 22 surrounds borehole 13. Sump pit 22 is connected by weir 23 to second pit 24. Second pit 24 is connected by hose 25 to pump 26 which is connected by hose 27 to mud cleaning complex 28. Mud cleaning complex 28 is connectable by hose 29 to holding tank 30 which is connected in series by hose 31 to holding tank 32 (additional holding tanks may be used as required) connectable by hose 33 to primary mud mixing tank 34. Primary mud mixing tank 34 is connected by hose 37 to mud pump 38. Mud pump 38 is connectable by hose 39 to drilling rig 14. Hose 39 includes valve 20. A supply of water (not shown) is connected to water pump 35 which is in turn connected by hose 36 to primary mud mixing tank 34. Hose 57 is a secondary hose to be used for transfer of drilling fluid from pipe side 9 to rig side 7. Hose 57 is connectable at one end to drill pipe 40 and at the opposite end to holding tank 30. A tank inlet valve 58 is located proximate the inlet point of hose to holding tank 30.

Figure 5:
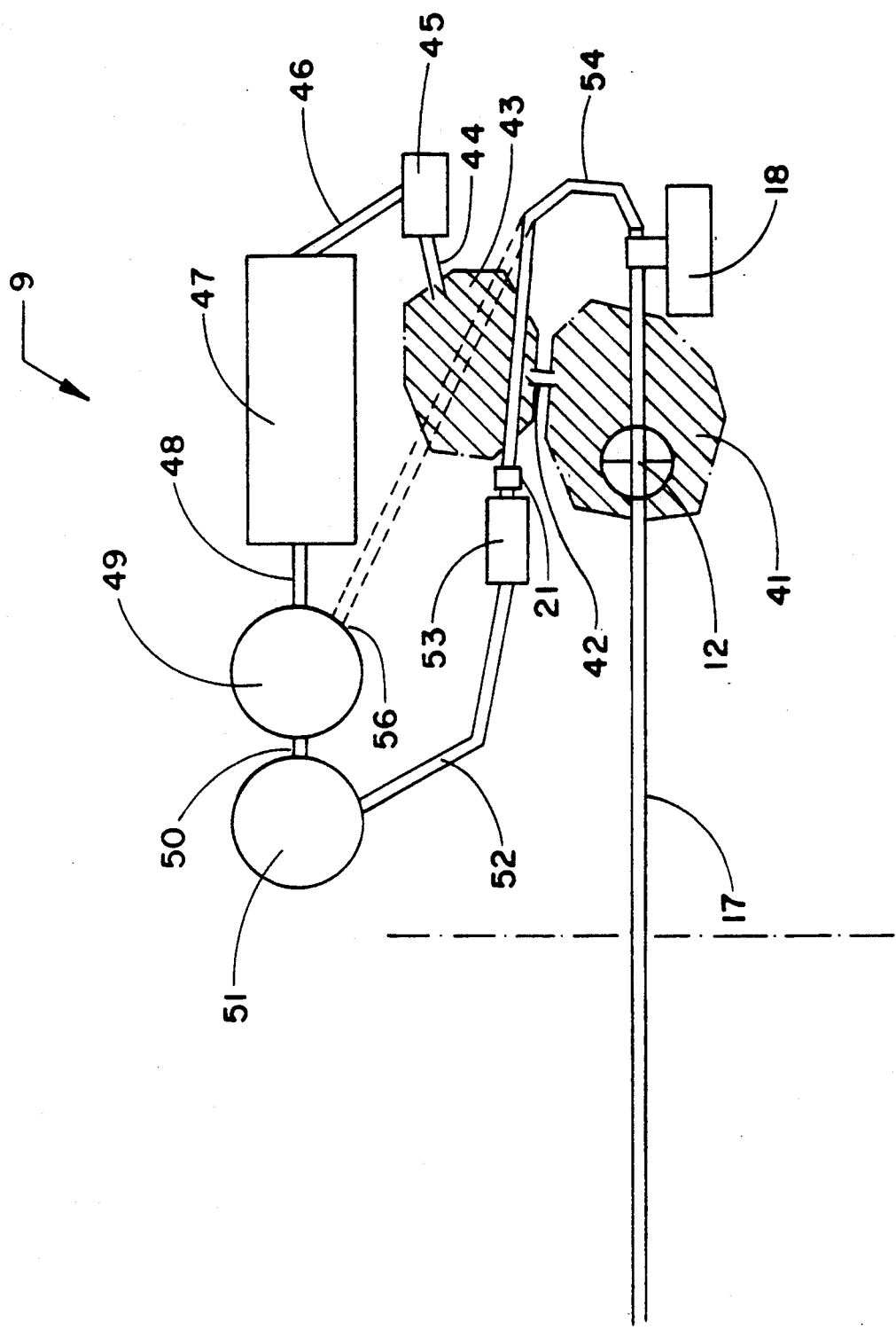
FIG. 5 is a schematic enlargement of the pipe side structures shown in FIG. 1.
Figure 8:
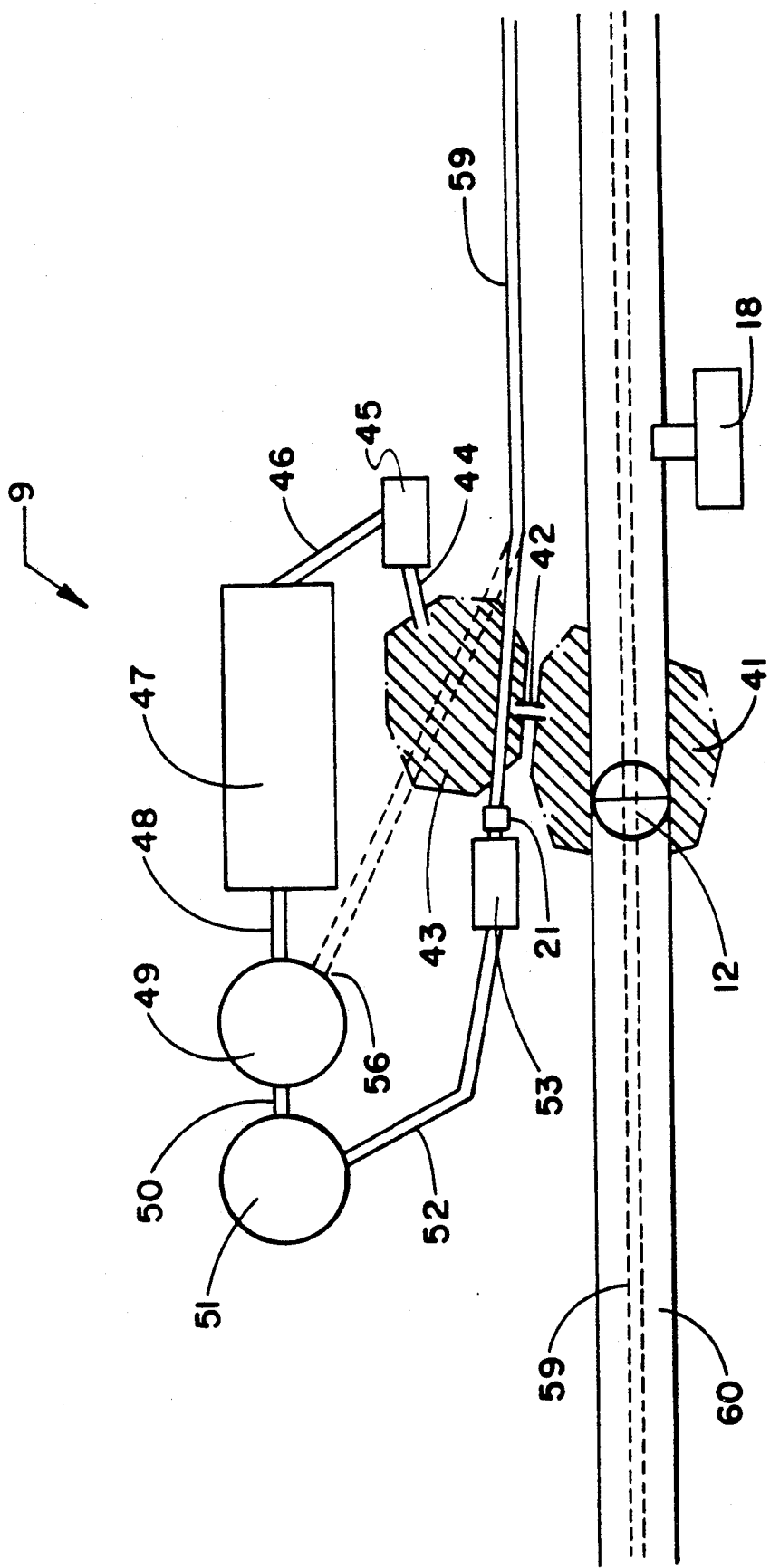
FIG. 8 is a schematic enlargement of the pipe side structures shown in FIGS. 6 and 7.

Referring to FIG. 5 the pipeside assembly 9 is represented. The structure and function of each of the individual elements shown for the pipeside assembly 9 are known to one of ordinary skill. As shown drillpipe 17 occupies the hole under the obstacle and exits at borehole 12. Sump pit 41 surrounds borehole 12 and is connected by weir 42 to second pit 43. Second pit 43 is connected by hose 44 to pump 45. Pump 45 is connected by hose 46 to mud cleaning complex 47. Mud cleaning complex 47 is connected by hose 48 to holding tank 49 which is in turn connected by hose 50 to holding tank 51 (additional holding tanks may be used as required). Holding tank 51 is connected by hose 52 to mud pump 53. Mud pump 53 is connected by hose 54 to drillpipe 17. Valve 21 is located in the hose line 54 between mud pump 53 and drill pipe 17. Holding tank 49 includes a tank inlet valve 56. Hose 54 can be disconnected from valve 21 and reconnected at tank inlet valve 56 to holding tank 49. A mud mixing tank (not shown) can be spliced into hose 52 used on the pipe side 9 if deemed necessary. Additionally a fresh water source can be attached to the mud mixing tank.

Referring to FIGS. 10-11, the hollow or flow-through swivel 19 is shown. The hollow high tension swivel 19 generally includes a hollow shaft 70, an outer casing 80, a hollow piston 90, and a hollow shaft and end cap 100.

Hollow shaft 70 includes a threaded tool joint 72 at one end and external threading 74 at the other end. Shaft 70 has a bore 76 therethrough. Although four are shown, the number of piston rings 78 may vary or be excluded.

Outer casing 80 defines a cavity 82. Grease zirk 84 allows communication from the outside of casing 80 to cavity 82. Zirk 84 includes a conduit 85 and a one way valve 86. The valve preferably comprises a ball and spring mechanism (not shown). Outer casing 80 includes internal threading 87. Annular plate 88 is fastened to outer casing 80 to block off one end of packing zone 83c of cavity 82. Cavity 82 includes three zones, a piston chamber or grease filled zone 83a, shaft chamber 83b and packing zone 83c.

Hollow piston 90 has a bore 92 therethrough and includes internal threading 94. Piston rings 96 circumscribe piston 90. Piston 90 includes a shoulder 97 and neck 98. Annular piston end cap 99 is attached to the end of piston 90.

Hollow shaft and end cap 100 contains a bore 102 therethrough. Hollow shaft and end cap 100 includes a threaded tool joint 104 at one end and external threading 106 at the other end. Gussets 108 are attached by any suitable means to hollow shaft and end cap 100.

Hollow high tension swivel 19 is constructed by placing hollow piston 90 within grease zone 83a of outer casing 80. Hollow shaft 70 is inserted into cavity 82 and attached by threads 74 to threads 94 to piston 90.

Annular brass plate 120 is placed flush against piston 90 and shaft 70 is inserted therethrough. A suitable packing such as V-LUBRICUP packing is inserted into packing zone 83c around shaft 70 prior to attaching hollow plate 88 to outer casing 80. Grease zone 83a is filled with grease by a zirk 84. Packing is smashed into annular zone 98a defined by neck 98 and outer casing 80. Annular piston end cap 99 is then attached to piston 90 by bolting through the threading to prevent unthreading of the interconnected parts during the swivel function. Hollow shaft and end cap 100 is then threaded by threads 106 to threading 87 on outer casing 80. Bolts 109 through the threading prevents disconnection of the threaded parts during the swivel function. Threaded tool joints 72 and 104 are used for connecting an adjoining tool.

During operation of swivel 19 there is a rigid connection between piston 90 and shaft 70 and a rigid connection between hollow shaft and end cap 100 and outer casing 80. However piston 90 and shaft 70 are rotatable relative to outer casing 80 and hollow shaft and end cap 100. Rotation will be imparted to one end of the swivel 19 by drilling rig 14. Hollow high tension swivel 19 has a limited life because the grease contained within grease zone 83a will over time, be pushed out of grease zone 83a. However, the maintenance requirements are relatively small since the swivel 19 can be disassembled, cleaned up, placed back together and filled with new grease. Annular brass plate 120 is functionally similar to piston rings 96 but is much easier and less expensive to replace than piston 90 in the event that swivel 19 is operated under high tensions after all of the grease has been evacuated from grease zone 83a. The design of hollow high tension swivel 19 allows for a continuous conduit for the passage of mud therethrough during operation when tensions of up to 500,000 pounds (the swivel can be designed for even larger tensions) are applied to the swivel. Ordinary bearing swivels would not allow mud passage therethrough, would not be able to withstand such high tensions and would be much more expensive to maintain. The reamer is typically attached to tool joint 72 for rotation of the reamer while the tool joint 104 remains relatively torsion free. Different lengths of pipe (not shown) may be attached between pullhead 61 and swivel 19 and between swivel 19 and reamer 11 to compensate for sharp radii which may be encountered depending upon the geometry of the crossing. This will protect swivel 19 from lateral flexure and bending since the flexure will be absorbed by the pipe (not shown).

Figure 12:
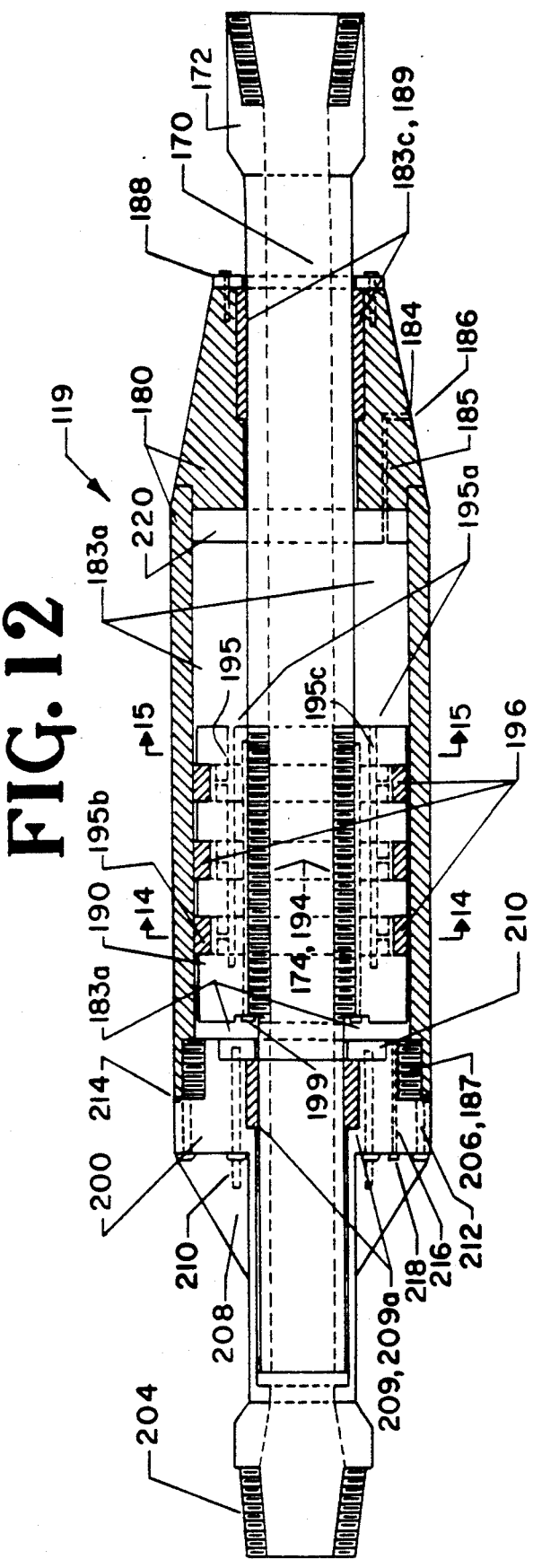
FIG. 12 is a cross sectional view of another embodiment of the swivel.
Figure 13:
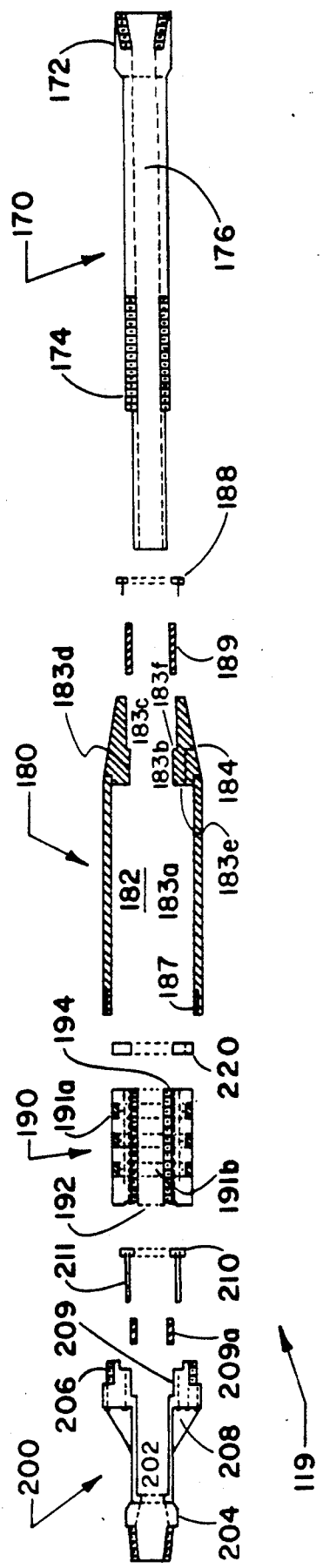
FIG. 13 is an exploded cross sectional view of the swivel shown in FIG. 12.

Referring to FIGS. 12-13 another embodiment of a hollow or flow-through swivel 19 is shown. This hollow, high tension swivel 119 generally includes a hollow shaft 170, an outer casing 180, a hollow segmented piston 190, and end cap/shaft guide 200.

The hollow shaft 170 includes a threaded tool joint 172 at one end and external threading 174 interposed between the two ends. As shown, the end with the threaded tool joint 172 is the distal end however external threading 174 could be placed at an intermediate position on shaft 170. Shaft 170 has a bore 176 therethrough.

Outer casing 180 defines a cavity 182. Grease zirk 184 allows communication from the outside of casing 180 to cavity 182. Zirk 184 includes a conduit 185 and a one-way valve 186. The valve preferably comprises a ball and spring mechanism (not shown). Outer casing 180 includes internal threading 187. Annular plate 188 is attachable to outer casing 180 to block off one end of packing zone 183c of cavity 182. Cavity 182 includes three zones, a piston chamber or greased filled zone 183a, shaft chamber 183b and packing zone 183c. The zones are bounded by a neck 183d which terminates at shoulders 183e and 183f.

Figure 15:
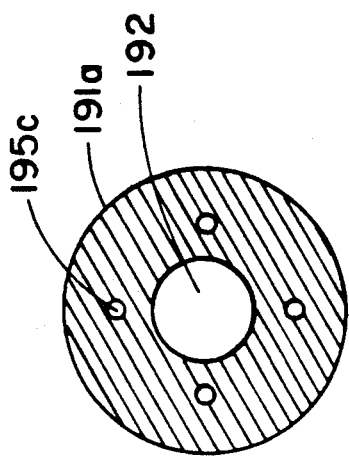
FIG. 15 is a cross section of the piston segment taken along line 15—15 of FIG. 12.
Figure 14:
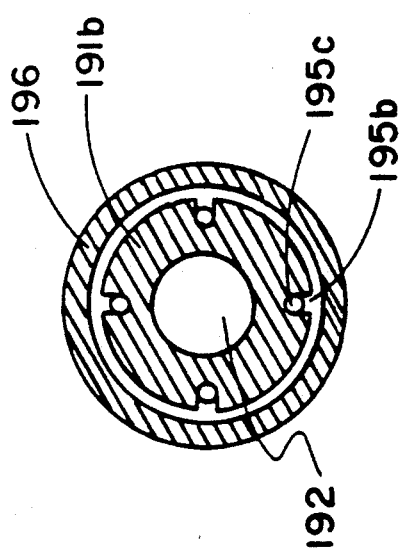
FIG. 14 is a cross section of the piston segment taken along line 14—14 of FIG. 12.

Segmented piston 190 is constructed from alternating piston segments 191 of alternating larger diameter segments 191a and smaller diameter segments 191b. All of the piston segments 191 are circular plates having a co-axial bore 192 therethrough which includes internal threads 194. The piston segments 191 preferably include hydraulic ducts 195c which make up a hydraulic chamber 195 when the segmented piston 190 is constructed. This chamber is in fluid communication between piston chamber 183a through inlet ports 195a to outlet ports 195b located on the outer surface or circumference of piston segments 191b (FIGS. 14-15). Piston rings 196 having an inner diameter greater than the outer diameter of piston segments 191b circumscribe piston segments 191b. The number and size of ducts 195 may vary as well as the surface area of ports 195b exposed to piston rings 196 to adjust the hydraulic pressure placed upon rings 196 while maintaining rotor function of the swivel 119. Bolts 199 are placed through piston segments 191a and 191b to hold the segments together as well as to fix segmented piston 190 on shaft 170. The number of segments 191 and rings 196 may vary as needed.

End cap/shaft guide 200 contains a bore 202 therethrough. A threaded tool joint 204 is located at one end of cap 200 and external threads 206 are located at the other end. Gussets 208 are attached by any suitable means for added support to cap 200. Cap 200 also defines a packing zone 209.

Hollow, high tension swivel 119 is constructed with a slick, slippery or anti-friction washer 220 placed within piston chamber 183a and abutting shoulder 183e. Washer 220 is preferably made of "VECTRON" or other suitable "TEFLON" or polytetrafluoroethylene type materials. Hollow, segmented piston 190 is placed within piston chamber 183a of casing 180. Hollow shaft 170 is inserted into cavity 182 through washer 220 and attached by threads 174 to threads 194 on piston 190.

A suitable packing such as "CHEVRON" packing 189 is inserted into packing zone 183c around shaft 170 prior to attaching hollow plate 188 to outer casing 180. Grease zone 183a is filled with grease or any other suitable hydraulic medium through zirk 184. "CHEVRON" type packing is also smashed into packing zone 209 and closed off the other end by a packing compression ring 210 with studs 211. Cap 200 is then placed over shaft 170 and fixed to casing 180 by threads 206, 187 and bolts 212. Bolts 212 also serve to prevent unthreading during swivel operation. O-ring 214 is squeezed between cap 200 and casing 180. Cap 200 also includes a grease release duct/port 216 capped off with plug 218. Threaded tool joints 172 and 204 are used for connecting to an adjoining tool or a piece of pipe.

During operation of the swivel 119 there is a rigid connection between segmented piston 190 and shaft 170 and a rigid connection between casing 180 and cap 200. However, shaft 170 and piston 190 act as rotary pieces relative to casing 180 and cap 200 which are stationary. Drilling rig 14 will impart rotary motion to tool joint 172 of swivel 119.

Hollow, high tension swivel 119 has a limited life because the grease contained within grease zone 183a will, over time, be squeezed out of grease zone 183a. However, the seepage of grease outside of piston rings 196 will be reduced in this swivel embodiment 119 due to the advantages realized by hydraulic chamber 195. As swivel 119 is placed in tension, the grease contained within grease zone 183a will be placed in compression which will force hydraulic piston rings 196 outward to increase the seal. Moreover, if all of the grease leaks out of the region between segmented piston 190 and slipper washer 220, slippery washer 220 will allow the swivel 119 to be functional without causing damage to segmented piston 190 and casing 180 attributable to steel on steel contact and without torsion being placed on the pipe due to failure of the rotary function.

If some of the grease seeps beyond plate 188 rather than past segmented piston 190, a vacuum will be created in grease zone 183 as segmented piston 190 is pulled toward washer 220. The vacuum acts as a positive force against the tension being placed upon swivel 119.

Shaft 170 extends into cap 200 a sufficient distance to support packing 209a even when segmented piston 190 is pulled all the way up against shoulder 183e. Very little stress is placed upon segmented piston 190 due to its interposed position on shaft 170 and from the grease and the washer 220. This arrangement causes much of the side loads to be absorbed by the shaft 170 and not by the piston 190 giving the piston 190 a longer life. Different lengths of pipe (not shown) may be attached to threaded tool joints 172 and 204 as described above for swivel 19.

The following cases describe possible scenarios for using this invention:

A. Case 1—Pre-reaming-pumping from rig side 7

Figure 9:
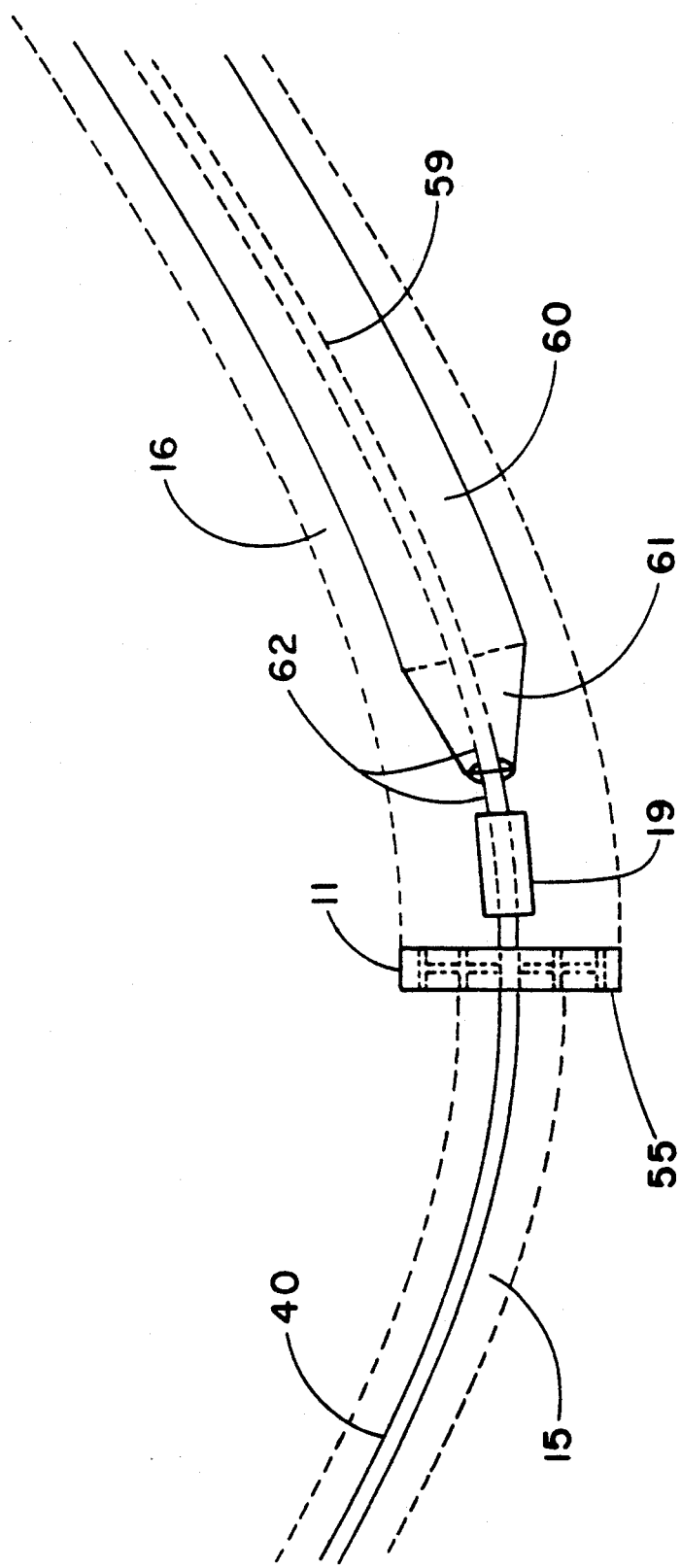
FIG. 9 is a schematic enlargement of the reamer/swivel/pull-head structures shown in FIGS. 6 and 7.

Referring to FIGS. 1-5, shut valve on pipeside 21; open valve 20 on rig side. Drilling fluids effusing from the borehole 13 accumulate in sump pit 22 until the fluid level reaches the invert level of the weir 23, at which time the fluids cascade into the second pit 24. Fluids from the top part of the second pit 24 are transferred to a mud cleaning complex 28 though hoses 25, 27 and a pump 26. The fluids, substantially cleaned of larger particles and sand, are pumped through hoses 29, 31 to holding tanks 30 and 32. Additional holding tanks may be incorporated. Cleaned fluids can be gravity drained into the primary mud mixing tank 34 as required through hose 33. Fresh water can be added to the mixing tank through hose 36 from a water pump 35 or other source. Calculated quantities of drilling fluids can be pumped through the mixing tank through hose 37 by the mud pump 38 and then through hose 39 and the valve 20 into the drilling rig 14 and down the inside of the drillpipe 40 and to the reamer 11. Since the valve 21 on the pipeside is shut, the drilling fluids are forced out of the reamer's jets 55 (FIG. 9). These fluids once again flow up the annular spaces 15, 16 to effuse into the rig side and pipe side sump pits 22, 41.

B. Case 2—Pre-reaming-pumping from pipe side 9

Shut valve on rig side 20; open valve on pipe side 21. Drilling fluids effusing from the borehole 12 accumulate in the sump pit 41 until the fluid level reaches the invert level of the weir 42, at which time the fluids cascade into the second pit 43. Fluids from the top part of the second pit 43 are transferred to a mud cleaning complex 47 through hoses 44, 46 and a pump 45. The fluids, substantially cleaned of larger particles and sand, are pumped through hoses 48, 50 to holding tanks 49 and 51. Additional holding tanks may be incorporated. Cleaned fluids can be pumped by the mud pump 53 via hose 52 through the valve 21 and hose 54 into the end of the drillpipe 17 and to the reamer 11. Since the valve 20 on the rig side is shut, the drilling fluids are forced out of the reamer's jets 55 (FIG. 9). These fluids once again flow up the annular spaces 15, 16 to effuse into the rig side and pipe side sump pits 22, 41. A mud mixing tank with a fresh water source can be added into the pipe side 9 configuration at hose 52 if deemed necessary.

C. Case 3—Pre-reaming-transferring of drilling fluids from one side to the other During the pre-reaming operation, it may become necessary to transfer some of the accumulated fluids from one side of the obstacle to the other side in order to balance volumes and efficiently use storage spaces 22, 24, 30, 32, 34, 41, 43, 49, 51 and any additional storage spaces.

a) Transfer of fluids from rig side 7 to pipeside 9

Open valve on rig side 20; disconnect hose 54 from valve 21 and re-connect hose to holding tank 49 at tank's inlet valve 56. Pump fluids from mud mixing tank 34 by mud pump 38 through hoses 37, 39 into drillpipe 40 via drilling rig 14, through reamer 11, hollow swivel 19, drillpipe 17, hose 54 and directly into holding tank 49. Additional holding tanks such as 51 will fill automatically since they are connected in series by hosing fixed to inlet valves at their bases. After transfer is completed, shut tank inlet valve 56 and reconnect hose 54 to valve 21. Note that during this transfer process, some fluids will effuse through reamer jets 55, however, due to the considerable difference in cross-sectional areas between the jets and the hoses and drillpipe, most of the fluids will travel to the holding tanks 49, 51 and any additional tanks. In any case the fluids effusing through the jets 55 will return to one side or the other via the bore hole annulus 15, 16 and subsequently become cleaned and pumped into the holding tanks 30, 32, 49, 51, as well as any additional tanks.

b) Transfer of fluids from pipe side 9 to rig side 7

Open valve on pipe side 21; disconnect drillpipe 40 at a convenient joint location above ground level near the entry point 13. Attach hose 57 to the end of the drillpipe 40 and the tank inlet valve 58 on holding tank 30. Pump fluids from holding tank 51 by mud pump 53 through hoses 52 and 59 into drillpipe 17, through hollow swivel 19, reamer 11, drillpipe 40, hose 57 and directly into holding tank 30. Additional holding tanks 32, and so forth, will fill automatically since they are connected in series to inlet valves at their base. After transfer is completed, shut tank inlet valves 56, 58, reconnect hose 54 to valve 21, and disconnect hose 57 from drillpipe 40. Re-attach drillpipe 40 at joint and continue with designed pre-reaming scenario. Note that during this transfer process, some fluids will effuse through reamer jets 55, however, due to the considerable difference in cross-sectional areas between the jets and the hoses and drillpipe, most of the fluids will travel to the holding tanks 30, 31, and so forth. In any case most of the fluids effusing through the jets 55 will return to one side or the other via the borehole annulus 15, 16 and subsequently become cleaned and pumped into the holding tanks 30, 32, 49, 51, as well as any additional holding tanks.

D. Case 4—Pipe pulling-pumping from rig side 7 (same as Case 1—Pre-reaming-pumping from rig side)

E. Case 5—Pipe pulling-pumping from pipe side 9

Shut valve on rig side 20; open valve on pipe side 21. Referring to FIGS. 6-9, drilling fluids effusing from the borehole 12 accumulate in the sump pit 41 until the fluid level reaches the invert level of the weir 42, at which time the fluids cascade into the second pit 43. Fluids from the top part of the second pit 43 are transferred to a mud cleaning complex 47 through hoses 44, 46 and a pump 45. The fluids, substantially cleaned of larger particles and sand, are pumped through hoses 48, 50 to holding tanks 49, 51 and so forth. Cleaned fluids can be pumped by the mud pump 53 via hose 52 through the valve 21 and hose 59, through the pull head 61, hollow swivel 19 and to the reamer 11. Hose 59 extends along the inside of the casing or pipeline 60 being pulled into the borehole and is attached to a short section of drillpipe 62 which has been welded through the end of the pullhead 61. The hollow swivel 19 is attached to the other side of this short section of drillpipe 62. The swivel 19 is in turn attached to the reamer 11. Since the valve 20 on the rig side is shut, the drilling fluids are forced out of the reamer's jets 55. These fluids once again flow up the annular spaces 15, 16 to effuse into the rig side and pipe side sump pits 22, 41. A mud mixing tank with a fresh water source can be added into the pipe side configuration at hose 52 if deemed necessary.

F. Case 6—Pipe pulling—transferring of drilling fluids from one side to the other During the pipe pulling operation, it may become necessary to transfer some of the accumulated fluids from one side of the obstacle to the other side in order to balance volumes and efficiently use storage spaces 22, 24, 30, 32, 34, 41, 43, 49, 51 and so on.

a) Transfer of fluids from rig side to pipe side

Open valve on rig side 20; disconnect hose 59 from valve 21 and re-connect hose to holding tank 49 at tank's inlet valve 56. Pump fluids from mud mixing tank 34 by mud pump 38 through hoses 37, 39 into drillpipe 40 via drilling rig 14, through reamer 11, hollow swivel 19, pull head 61 and short section of welded drillpipe 62, hose 59 and directly into holding tank 49. Additional holding tanks 51, etc. will fill automatically since they are connected in series by hoses fixed to inlet valves at their bases. After transfer is completed, shut tank inlet valve 56 and reconnect hose 59 to valve 21. Note that during this transfer process, some fluids will effuse through reamer jets 55, however, due to the considerable difference in cross-sectional areas between the jets and the hoses and drillpipe, most of the fluids will travel to the holding tanks 49, 51, etc. In any case most of the fluids effusing through the jets 55 will return to one side or the other via the borehole annulus 15, 16 and subsequently become cleaned and pumped into the holding tanks 30, 32, 49, 51, etc.

b) Transfer of fluids from pipe side 9 to rig side 7

Open valve 21 on pipe side 9; disconnect drillpipe 40 at a convenient joint location above ground lever near the entry point 13. Attach hose 57 to the end of the drillpipe 40 and the tank inlet valve 58 on holding tank 30. Pump fluids from holding tank 51 by mud pump 53 through hoses 52, 59, through the small section of drillpipe 62 welded in the end of the pull-head 61, through the hollow swivel 19, reamer 11, drillpipe 40, hose 57 and directly into holding tank 30. Additional holding tanks 32, etc. will fill automatically since they are connected in series by hoses fixed to inlet valves at their bases. After transfer is completed, shut tank inlet valves 56, 58, reconnect hose 59 to valve 21, and disconnect hose 57 from drillpipe 40. Re-attach drillpipe 40 at the joint and continue with designed pipe pulling scenario. Note that during this transfer process, some fluids will effuse through reamer jets 55, however, due to the considerable difference in cross-sectional areas between the jets and the hoses and drillpipe, most of the fluids will travel to the holding tanks 30, 31, etc. In any case most of the fluids effusing through the jets 55 will return to one side or the other via the borehole annulus 15, 16 and subsequently become cleaned and pumped into the holding tanks 30, 32, 49, 51, etc.

The preferred embodiment of the invention has been shown and described above. It is to be understood that minor changes in the details, construction and arrangement of the parts and steps may be made without departing from the spirit or scope of the invention as described and claimed.

What is claimed is:

1. A method for recirculating mud through a hole occupied by a string of pipe having a conduit therethrough starting from one side of an obstacle and emerging at another side of the obstacle, comprising the steps of:

attaching a means for working the hole to the string of pipe, said hole working means defining a conduit therethrough;

closing the conduit on one side of said hole working means;

pumping mud from the side of the obstacle opposite the closed side of the hole to operate said hole working means; and collecting mud expelled by said hole working means and forced out of the hole at both sides of the obstacle.

2. The method according to claim 1, further including the steps of:

cleaning the collected mud; and storing the cleaned mud for pumping into the conduit as needed.

3. The method according to claim 1, wherein said step of attaching said hole working means to the string of pipe comprises:

attaching one end of a flow-through reamer to the string of pipe;

attaching one end of a high tension flow-through swivel to the other end of said flow-through reamer; and attaching the other end of said high tension, flow-through swivel to another string of pipe to establish a continuous conduit from one side of the obstacle to the other side of the obstacle.

4. A method for recirculating mud through a hole starting from one side of an obstacle and emerging at another side of the obstacle where the hole is occupied by a string of pipe defining a first conduit therethrough, comprising the steps of:

constructing a continuous conduit through the hole by attaching one end of a flow-through means for working the hole to the string of pipe and by attaching the other end of said flow-through hole working means to another string of pipe defining a second conduit emerging from the hole on the other side of the obstacle;

connecting the second conduit to a vessel; and pumping mud into the first conduit through the hole working means and the second conduit into the vessel.

5. The method according to claim 4, wherein said step of constructing a continuous conduit through the hole by attaching one end of a flow-through means for working the hole to the string of pipe further includes rotating the string of pipe relative to the other string of pipe while flowing the mud through a swivel.

6. The method according to claim 4, further including the steps of:

cleaning the mud pumped into the vessel; and storing the cleaned mud for pumping as needed.

7. A method for working a hole, the hole starting on one side of an obstacle and emerging on another side of an obstacle, comprising the steps of:

occupying the entire hole with a series of interconnected components including a string of pipe, a flow-through reamer, a flow-through swivel and a second string of pipe, said series of components establishing a conduit therethrough;

pumping mud into the conduit from one side of the obstacle to the reamer;

collecting mud forced out of either side of the hole in a vessel; and repumping the collected mud into the conduit on the side of the obstacle upon which it is collected.

8. The method according to claim 7, further comprising the step of cleaning the collected mud on the side of the obstacle upon which it emerges prior to said repumping step.

9. The method according to claim 7, wherein said step of occupying the entire hole with a series of interconnected components further includes simultaneous rotating, applying a tension and passing pressurized mud through the flow-through swivel.

10. A flow-through, high-tension swivel comprising:

a shaft defining a bore therethrough;

a piston defining a bore therethrough, said piston having a circumscribing piston ring and being rigidly connected to said shaft;

a casing defining a zone for housing said piston and allowing passage of said shaft;

a cap defining a bore therethrough, said cap being rigidly connected to said outer casing.

11. The flow-through, high-tension swivel according to claim 10 wherein said piston is a segmented piston.

12. The flow-through, high-tension swivel according to claim 10 wherein the bore in said cap houses one end of said shaft.

13. The flow-through, high-tension swivel according to claim 10, further including an annular plate placed over said shaft adjacent said piston within the zone for housing said piston.

14. The flow-through, high-tension swivel according to claim 10, further including a slippery washer placed over said shaft within the zone for housing said piston.

15. The flow-through, high-tension swivel according to claim 10, further including a hydraulic medium occupying the zone for housing said piston.

16. A flow-through, high tension swivel, comprising:
a shaft defining a bore therethrough;
a segmented piston defining a bore therethrough, said segmented piston being rigidly connected over said shaft and interposed between a first end and a second end of said shaft;
a plurality of piston rings circumscribing said segmented piston;
said segmented piston defining a hydraulic chamber in fluid communication with said piston rings;
a casing defining a piston chamber and a bore allowing passage of the first end of said shaft; and
a cap defining a bore therethrough for housing the second end of said shaft, said cap being rigidly connected to said casing.

17. The flow-through, high tension swivel according to claim 16, further comprising:
a slippery washer placed over said shaft within said piston chamber.

18. The flow-through, high tension swivel according to claim 16, further including a hydraulic medium occupying the piston chamber and the hydraulic chamber.

* * * * *